United States Patent [19]

Dunne

[11] Patent Number: 5,574,552
[45] Date of Patent: Nov. 12, 1996

[54] SELF-CALIBRATING PRECISION TIMING CIRCUIT AND METHOD FOR A LASER RANGE FINDER

[75] Inventor: Jeremy G. Dunne, Littleton, Colo.

[73] Assignee: Laser Technology, Inc., Englewood, Colo.

[21] Appl. No.: 375,941

[22] Filed: Jan. 19, 1995

[51] Int. Cl.$^6$ ............................ G01C 3/08; G01S 13/08; G01P 3/36
[52] U.S. Cl. .................. 356/5.05; 342/134; 342/135; 342/202; 356/28
[58] Field of Search .................... 342/134–137, 342/202–204; 367/127; 356/5.01–5.08, 28

[56] References Cited

U.S. PATENT DOCUMENTS

| | | |
|---|---|---|
| 3,644,740 | 2/1972 | Dobratz et al. . |
| 3,959,641 | 5/1976 | Miller, Jr. et al. . |
| 4,214,242 | 7/1980 | Colin . |
| 4,259,592 | 3/1981 | Frungez et al. . |
| 4,569,599 | 2/1986 | Bolkow et al. ............ 368/120 |
| 4,571,085 | 2/1986 | Anderson . |
| 4,699,508 | 10/1987 | Bolkow et al. . |
| 4,770,526 | 9/1988 | Manhart et al. . |
| 5,157,403 | 10/1992 | Urkowitz ............... 342/203 |
| 5,359,404 | 10/1994 | Dunne ..................... 356/5 |

OTHER PUBLICATIONS

Pro Laser II, Infrared Lidar System, User Manual P/N 006–0535–00, Kustom Signals, Inc. Chanute, Kansas, copyright 1991, pp. 1–37.
ProLaser II, Traffic Safety Lidar, Lidar System Functions, Lidar System Specifications Brochure, Kustom Signals, Inc., Lenexa, KS, Feb. 1994, pp. 1–4.
Marksman LTI 20–20 Laser Speed Detection System, Operator's Manual, Laser Technology, Inc., Englewood, Colorado, copyright 1994, pp. 1–45.

*Primary Examiner*—Stephen C. Buczinski
*Attorney, Agent, or Firm*—William J. Kubida; Holland & Hart LLP

[57] ABSTRACT

A highly precise range measurement instrument is made possible through the use of a novel and efficient precision timing circuit which makes use of the instrument's internal central processing unit crystal oscillator. A multi-point calibration function includes the determination of a "zero" value and a "cal" value through the addition of a known calibrated pulse width thereby providing the origin and scale for determining distance with the constant linear discharge of capacitor.

22 Claims, 8 Drawing Sheets

SELF-CALIBRATING PRECISION TIMING CIRCUIT AND METHOD FOR A LASER RANGE FINDER

CROSS REFERENCE TO RELATED APPLICATIONS

The present invention is related to those disclosed and claimed in U.S. patent application Ser. No. 08/375,945 for: "Laser Range Finder Having Selectable Target Acquisition Characteristics and Range Measuring Precision"; and Ser. No. 08/375,810 for: "Automatic Noise Threshold Determining Circuit and Method for a Laser Range Finder" all filed concurrently herewith and assigned to the assignee of the present invention, Laser Technology, Inc., Englewood, Colo., the disclosures of which are hereby specifically incorporated by this reference.

BACKGROUND OF THE INVENTION

The present invention relates, in general, to the field of distance or range measuring equipment. More particularly, the present invention relates to a laser based range finder which may be inexpensively produced yet provides highly accurate precision range measurements of up to 1000 yards or more with a resolution of less than 1 yard. The laser range finder herein disclosed has a number of user selectable target acquisition and enhanced precision measurement modes which may be viewed on an in-sight display during aiming and operation of the instrument. Extremely efficient self-calibrating precision timing and automatic noise threshold circuits incorporated in the design provide a compact, low-cost, highly accurate and reliable ranging instrument for a multitude of uses.

Laser based distance and range measuring equipment have been used for a number of years to provide extremely accurate distance measurements to a remote target or object. A representative instrument is the Criterion™ 100 laser range finder developed and marketed by Laser Technology, Inc., assignee of the present invention. Although a highly accurate and reliable device, its great distance ranging capability and inherent complexity translates to a cost and form factor most suitable only for certain specific applications. A need therefore exists for a laser based range finder of perhaps more limited range, which can be economically manufactured as a rugged, compact unit to provide accurate distance measurement capabilities in other less stringent types of applications.

SUMMARY OF THE INVENTION

Herein disclosed is a precise, yet accurate and reliable laser range finder which may be economically produced and is adapted to individual portable use in a unit potentially weighing less than a pound with an on-board battery based power supply. Moreover, the compact instrument herein provided has a number of user selectable target acquisition operational modes which may be invoked depending on the distance, type and reflectivity of the target being sighted.

Through the use of an in-sight display, distance or range information can be shown while the user may also view and select the instrument's mode of operation through successive actuations of a push button mode switch while simultaneously sighting the target object. A precision mode of operation may also be invoked in which an even more precise measurement to an object may be achieved following an initial measurement together with the visual indication of a "precision flag" on the in-sight display.

A highly precise range measurement is made possible through the use of a novel and efficient timing circuit which makes use of the instrument's internal central processing unit crystal oscillator. A likewise unique automatic noise threshold determining circuit allows for instrument operation with a low signal-to-noise ratio to optimize sensitivity and performance in conjunction with a processor based pulse discrimination procedure which, nevertheless assures accurate range measurements.

The unit herein disclosed can be utilized in a multitude of endeavors including such recreational activities as golf where it can be utilized to very accurately determine the distance to a flag or pin as well as to trees and other natural objects. The principles of the invention are further applicable to the design of a laser based "tape measure" where ranges can be precisely measured with resolutions of on the order of an inch or less.

Specifically disclosed herein is a self-calibrating, precision timing circuit and method for determining a range to a target based upon a flight time of a pulse toward the target. The circuit comprises means for initially establishing first and second reference voltage levels together with means for unclamping the second reference voltage level and means for allowing the second reference voltage level to then diminish at a first rate to the first reference voltage level. Further provided are means for storing a first reference time extending from the step of unclamping until the first and second reference voltage levels are determined to be equal. Means are also provided for then re-establishing the first and second reference voltage levels together with means for again unclamping the second reference voltage level. Additional means are provided for increasing the second reference voltage level at a second higher rate than the first rate for a predetermined period of time to establish a third reference voltage level together with means for then allowing the third reference voltage level to diminish at the first rate to the first reference voltage level at which time, a second reference time extending from the step of again unclamping until the first and third reference voltage levels are equal is additionally stored. The first and second reference voltage levels are again re-established and the second reference voltage level is further unclamped. Means are provided for again increasing the second reference voltage level at the second higher rate for a period of time related to the flight time of the pulse to the target to establish a fourth reference voltage level, together with means for then allowing the fourth reference voltage level to diminish at the first rate to the first reference voltage level. A third reference time extending from the unclamping of the second reference voltage level until the first and fourth reference voltage levels are equal is then stored and the range to the target may be computed as proportional to the quantity of the (third reference time minus the first reference time) divided by the quantity of the (second reference time minus the first reference time).

In a particular embodiment the establishing means may comprise a transistor switch for coupling a capacitor to a source of the second voltage while the unclamping means may comprise a second transistor switch for decoupling the capacitor from the second voltage source. The allowing means may comprise a third transistor switch coupling a resistor to the capacitor to bleed off the charge therefrom.

The means for increasing the second reference voltage level may comprise means for applying a charge to the capacitor at the second rate and the predetermined time period specified may be determined by reference to a crystal oscillator. In a particular embodiment, the second charging rate may be substantially 1000 times the first discharging rate.

DETAILED DESCRIPTION OF THE DRAWINGS

The foregoing and other features and objects of the present invention and the manner of attaining them will become more apparent and the invention itself will be best understood by reference to the following description of a preferred embodiment taken in conjunction with the accompanying drawings, wherein.

Figure 1:
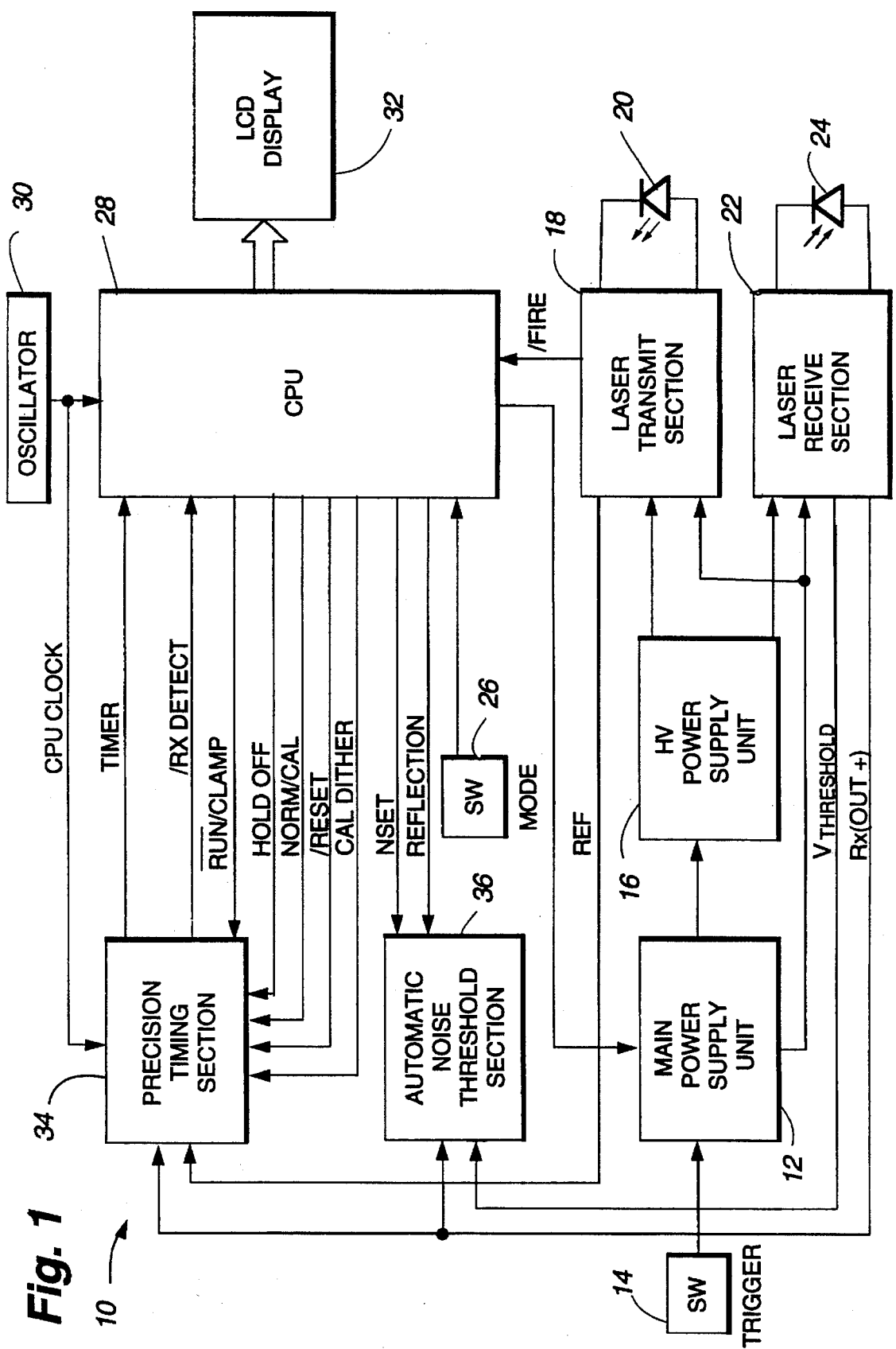
FIG. 1 is a simplified logic block diagram of a laser range finder in accordance with the present invention illustrating the significant functional aspects thereof, inclusive of a laser signal transmitting and receiving section, central processing unit and the precision timing and automatic noise threshold sections thereof.
Figure 6:
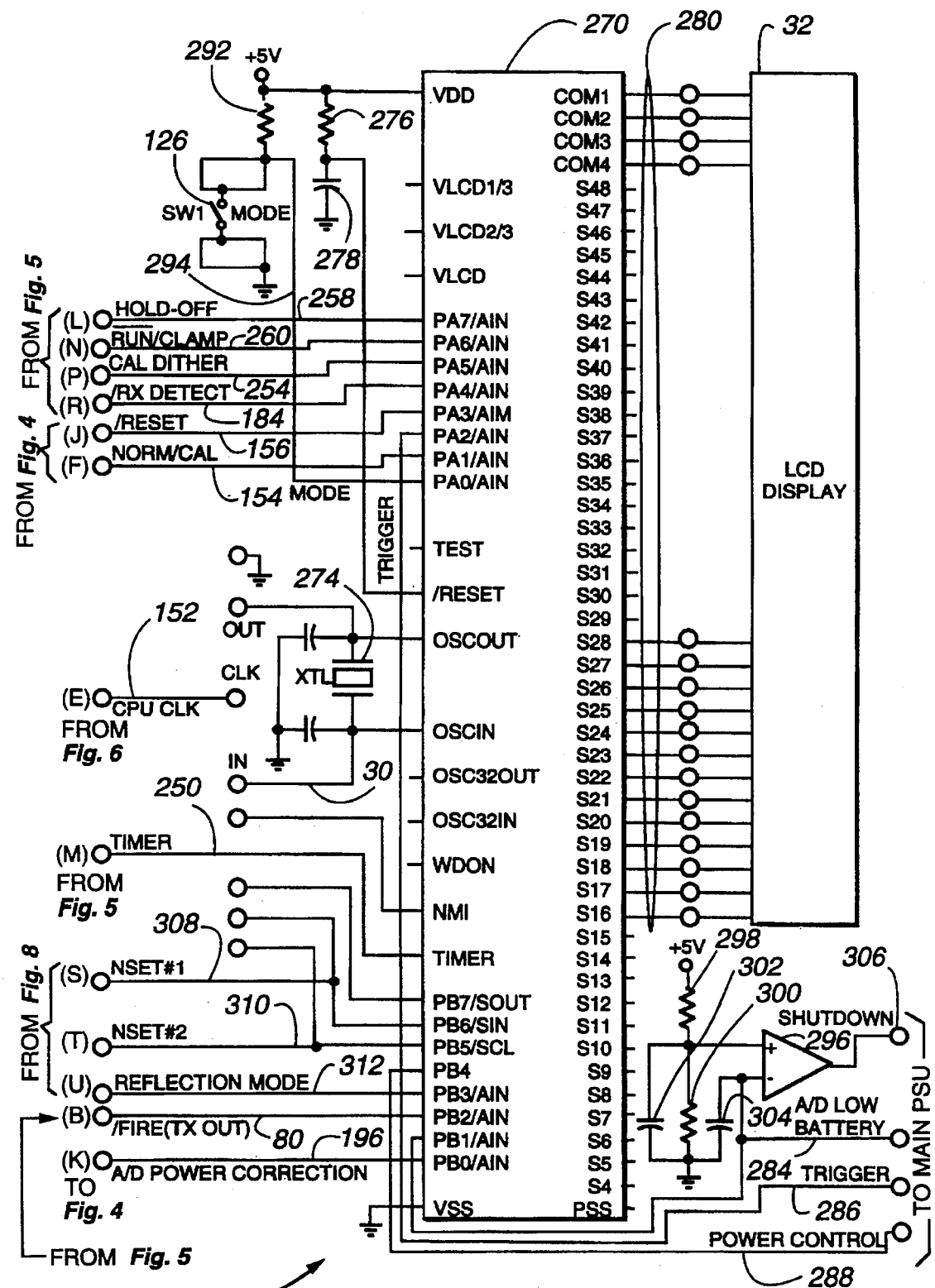
Figure 7A:
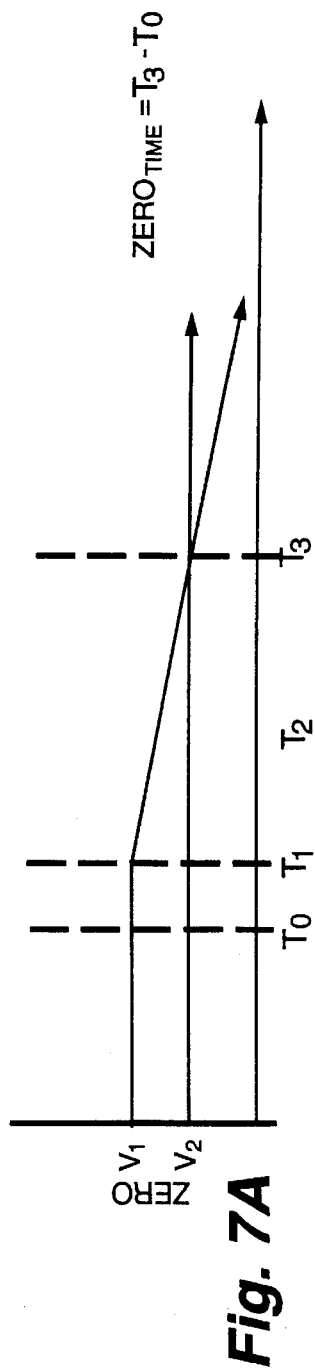
Figure 7B:
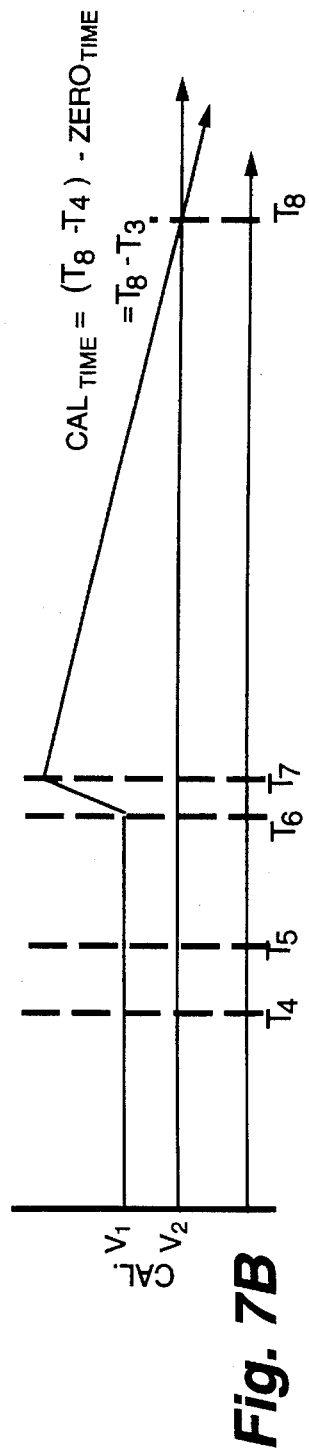
Figure 7C:
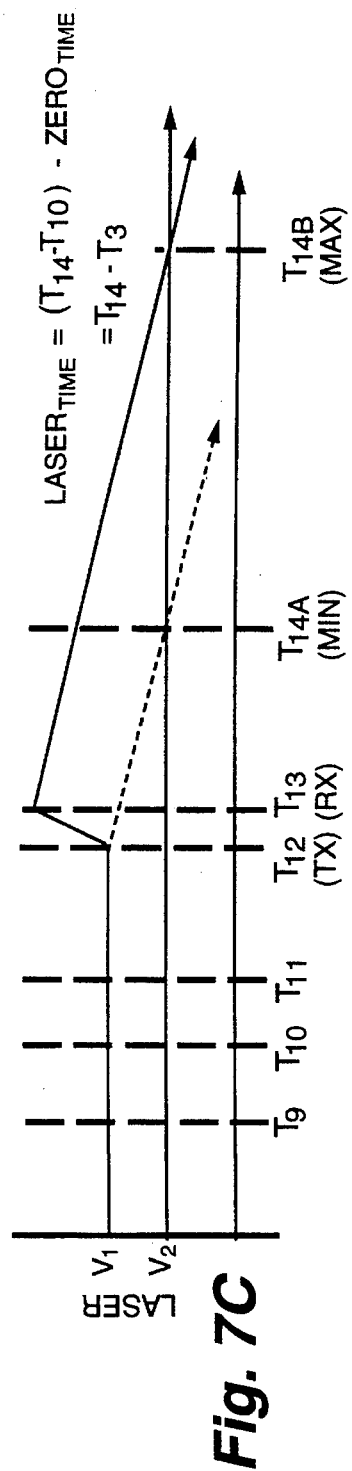
Figure 8:
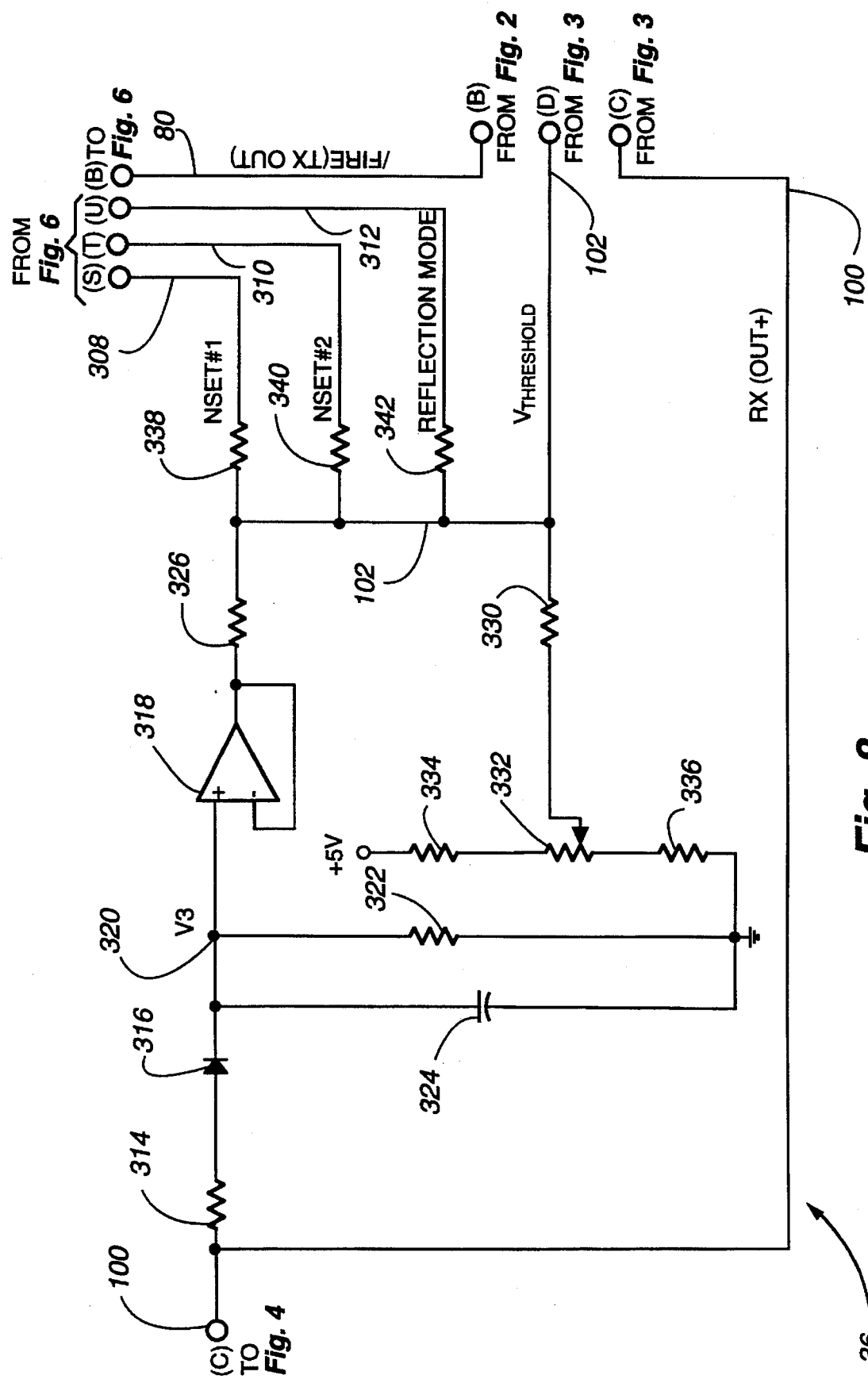

FIG. 6 is an additional detailed schematic diagram of the central processing unit ("CPU") portion of the laser range finder of FIG. 1 illustrating the CPU, associated oscillator and the in-sight liquid crystal display ("LCD") for displaying measured distances to an operator of the laser range finder in addition to the various signals for operative association with the precision timing and automatic noise threshold sections thereof;

FIGS. 7A, 7B and 7C are individual graphic representations of the voltages $V_1$ and $V_2$ of certain of the precision timing section circuit nodes during the zero, calibration and laser firing phases of operation from which the values $Zero_{TIME}$, $Cal_{TIME}$ and $Laser_{TIME}$ are derived to enable rapid and accurate calculation of the distance to an object from the laser range finder; and FIG. 8 is a final detailed schematic diagram of the automatic noise threshold section of the laser range finder of FIG. 1 illustrating the various components thereof as well as the signals coupling the same to the laser receive section and CPU.

DESCRIPTION OF A PREFERRED EMBODIMENT

With reference now to FIG. 1, a logic block diagram of a laser range finder 10 in accordance with the present invention is shown. The laser range finder 10 includes, in pertinent part, a main power supply unit ("PSU") 12 as operatively controlled by a trigger switch 14. The main power supply unit 12 is coupled to a high voltage ("HV") power supply unit 16 for supplying operating power in conjunction with the main power supply unit 12 to a laser transmit section 18.

The laser transmit section 18 activates a laser emitting diode 20 for directing a laser signal toward an object in the operation of the laser range finder 10. The laser transmit section 18 also supplies a /FIRE signal to the central processing unit ("CPU") section 28 as will be more fully described hereinafter.

The main power supply unit 12 also supplies operating power to a laser receive section 22 which further has as an input a signal generated by a laser receiving diode 24 as the laser signal emitted from the laser emitting diode 20 is reflected from an object back thereto. The laser receive section 22 supplies a $V_{threshold}$ signal and RX(OUT+) signal respectively to an automatic noise threshold section 36 and a precision timing section 34 both of which will be described in more detail hereinafter.

The CPU section 28 receives as one input a signal from a mode switch 26 by means of which an operator can change the operating mode and functional operation of the laser range finder 10. An oscillator 30 supplies a clocking signal to the CPU section 28 as well as to the precision timing section 34. The CPU section 28 provides an output indicative of the distance from the laser range finder 10 to an object as sighted through a viewing scope thereof on an in-sight liquid crystal display ("LCD") 32.

The precision timing section 34 provides a number of signals to the CPU section 28 including a TIMER and /RX DETECT signals as shown and receives a $\overline{RUN/CLAMP}$ signal back therefrom. The CPU section 28 provides a number of signals to the precision timing section 34 including a HOLD OFF, NORM/CAL, /RESET, and a CAL DITHER signal. The automatic noise threshold section 36 also receives a number of inputs from the CPU section 28 including a number of noise set ("NSET") signals and a REFLECTION MODE signal to operatively control its function.

Figure 2:
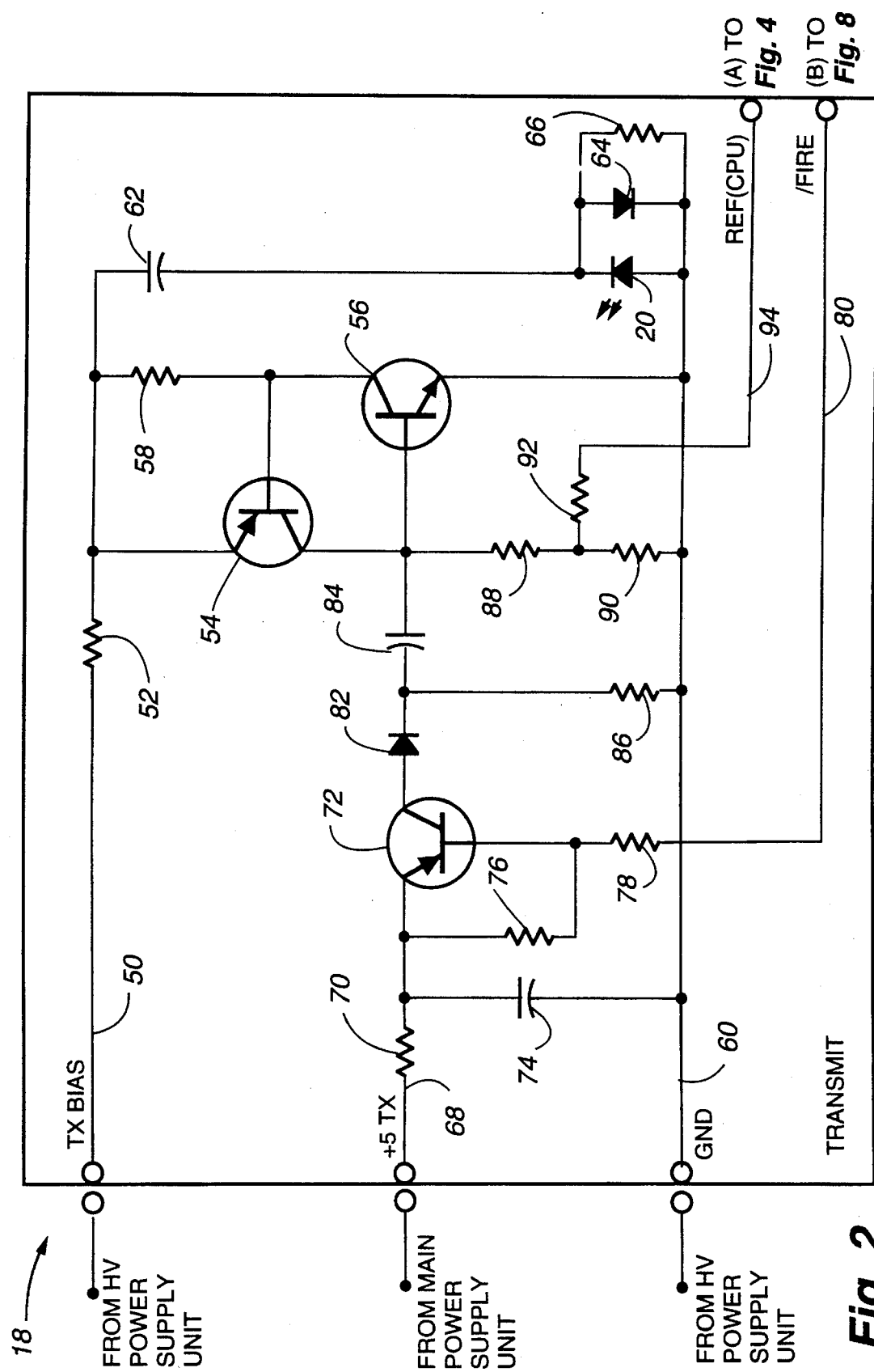
FIG. 2 is a detailed schematic diagram of the laser transmit section of FIG. 1 illustrating, inter alia, the laser signal producing diode and the associated driving and reference signal producing circuitry.

With reference additionally now to FIG. 2, the laser transmit section 18 is shown in more detail. The laser transmit section 18 receives a transmit ("TX") BIAS signal on supply line 50 of approximately 110 to 140 volts for application through resistor 52 to the emitter of transistor 54. The emitter of transistor 54 is coupled to its base by means of a resistor 58 which also couples the collector of transistor 56 to resistor 52. The emitter of transistor 56 is connected to circuit ground on ground line 60. A capacitor 62 couples the emitter of transistor 54 to the cathode of the laser emitting diode 20 which has its anode also connected to circuit ground 60. An additional diode 64 is coupled in parallel with the laser emitting diode 20 having its anode connected to the cathode of the laser emitting diode 20 and its cathode connected to circuit ground 60. A resistor 66 is placed in parallel with the laser emitting diode 20 and the diode 64.

A source of +5 volts is also received by the laser transmit section 18 on supply line 68 through resistor 70. Resistor 70 is coupled to the emitter of transistor 72 as well as to circuit ground 60 through a capacitor 74. A resistor 76 couples the emitter of transistor 72 to its base which is coupled through resistor 78 to line 80 for supplying a /FIRE signal to the CPU section 28 (shown in FIG. 1).

An additional diode 82 has its anode connected to the collector of transistor 72 and its cathode coupled to circuit ground 60 through resistor 86. A capacitor 84 couples the cathode of diode 82 to the common connected collector of transistor 54 and base of transistor 56. The common connected collector of transistor 54 and base of transistor 56 is coupled through a voltage divider network comprising resistor 88 and resistor 90 to circuit ground. A resistor 92 coupled between resistor 88 and resistor 90 provides a REF signal on line 94 for application to the precision timing section 34 (shown in FIG. 1).

Figure 3:
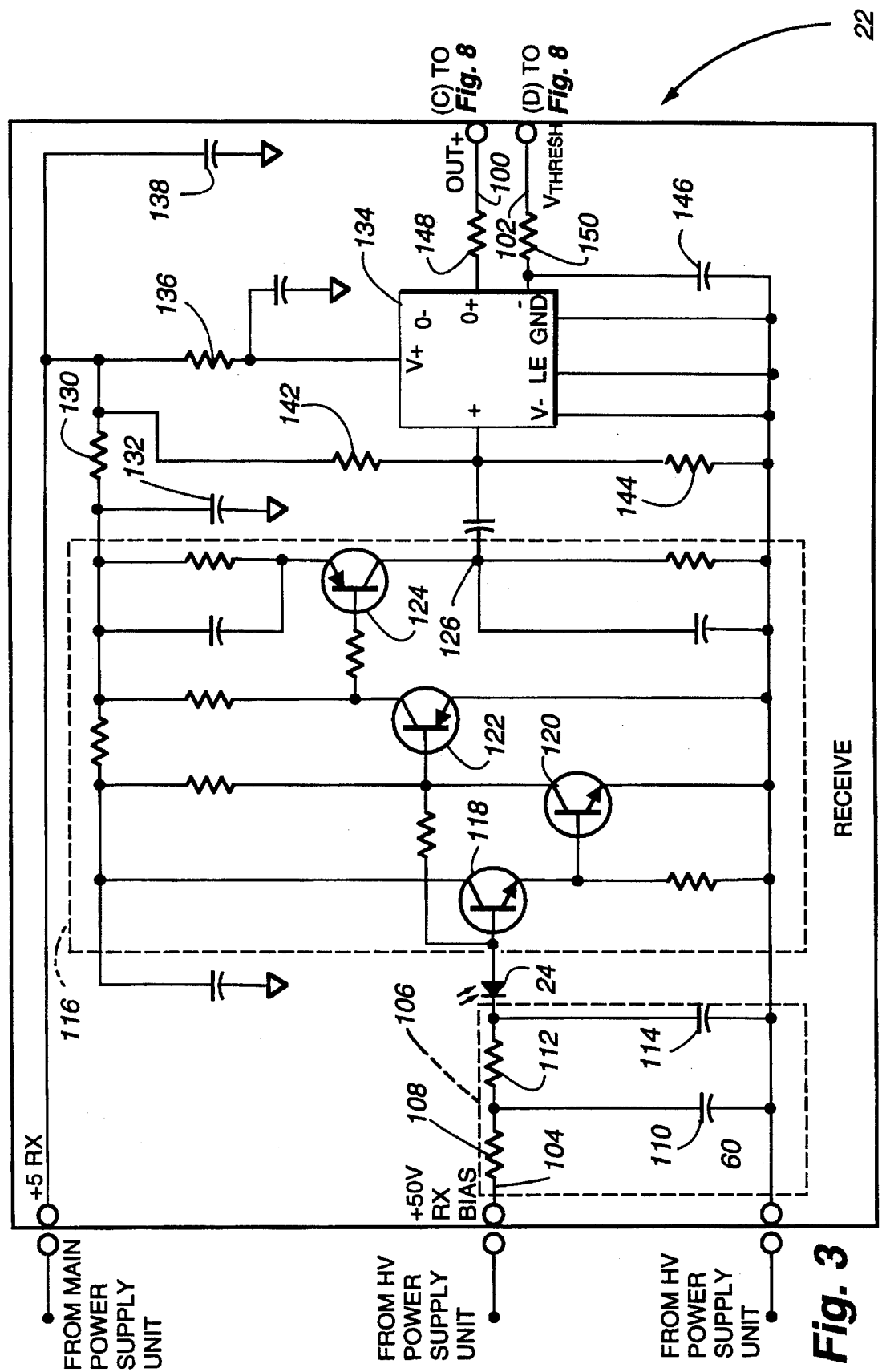
FIG. 3 is an additional detailed schematic diagram of the laser receive section of FIG. 1 illustrating, inter alia, the laser signal receiving diode, transimpedance amplifier and the precision comparator for establishing the $V_{threshold}$ and RX(Out+) signals for the precision timing and automatic noise threshold circuits.

With reference additionally now to FIG. 3, the laser receive section 22 is shown in more detail. The output signals of the laser receive section 22 are the signals RX(OUT+) and $V_{threshold}$ provided on lines 100 (FIGS. 4, 8) and 102 (FIG. 8) respectively for application to the precision timing section 34 and automatic noise threshold section 36 as previously shown in FIG. 1. A source of +50 volts providing a receive ("RX") BIAS signal is input to the laser receive section 22 from the HV power supply unit 16 on supply line 104. A low pass filter network 106 comprising resistors 108 and 112 in conjunction with capacitors 110 and 114 couples the supply line 104 to circuit ground 60 to provide a bias signal to the cathode of the laser receiving diode 24. The laser receiving diode 24 has its anode connected to the base of transistor 118 which, in conjunction with transistors 120, 122, and 124 comprises a transimpedance amplifier 116 providing an output on node 126 which is capacitively coupled to the "+" input of a precision comparator 134. A source of +5 volts is input to the laser receive section 22 from the main power supply unit 12 (shown in FIG. 1) for input to the transimpedance amplifier 116 through a low pass filter comprising resistor 130 and capacitor 132. The +5 volt RX supply voltage is also coupled to the V+ input of the precision comparator 134 through resistor 136 and is coupled to circuit ground through capacitor 138. The "+" input of the precision comparator 134 is connected between the plus 5 volt RX voltage source and circuit ground 60 through the node intermediate resistor 142 and resistor 144.

The precision comparator 134 which may, in a preferred embodiment, comprise a MAX 913 low power precision transistor-transistor logic ("TTL") comparator available from Maxim Integrated Products, Inc., Sunnyvale, Calif., has its "V−", "LE" and ground ("GND") inputs connected to circuit ground 60 as shown. A capacitor 146 couples the "−" output of the precision comparator 134 to circuit ground 60 as shown. The "O+" output of the precision comparator 134 is supplied through a resistor 148 to line 100 to provide the RX(OUT+) signal while the "−" output of the precision comparator 134 is supplied through resistor 150 to line 102 to provide the $V_{threshold}$ signal.

Figure 4:
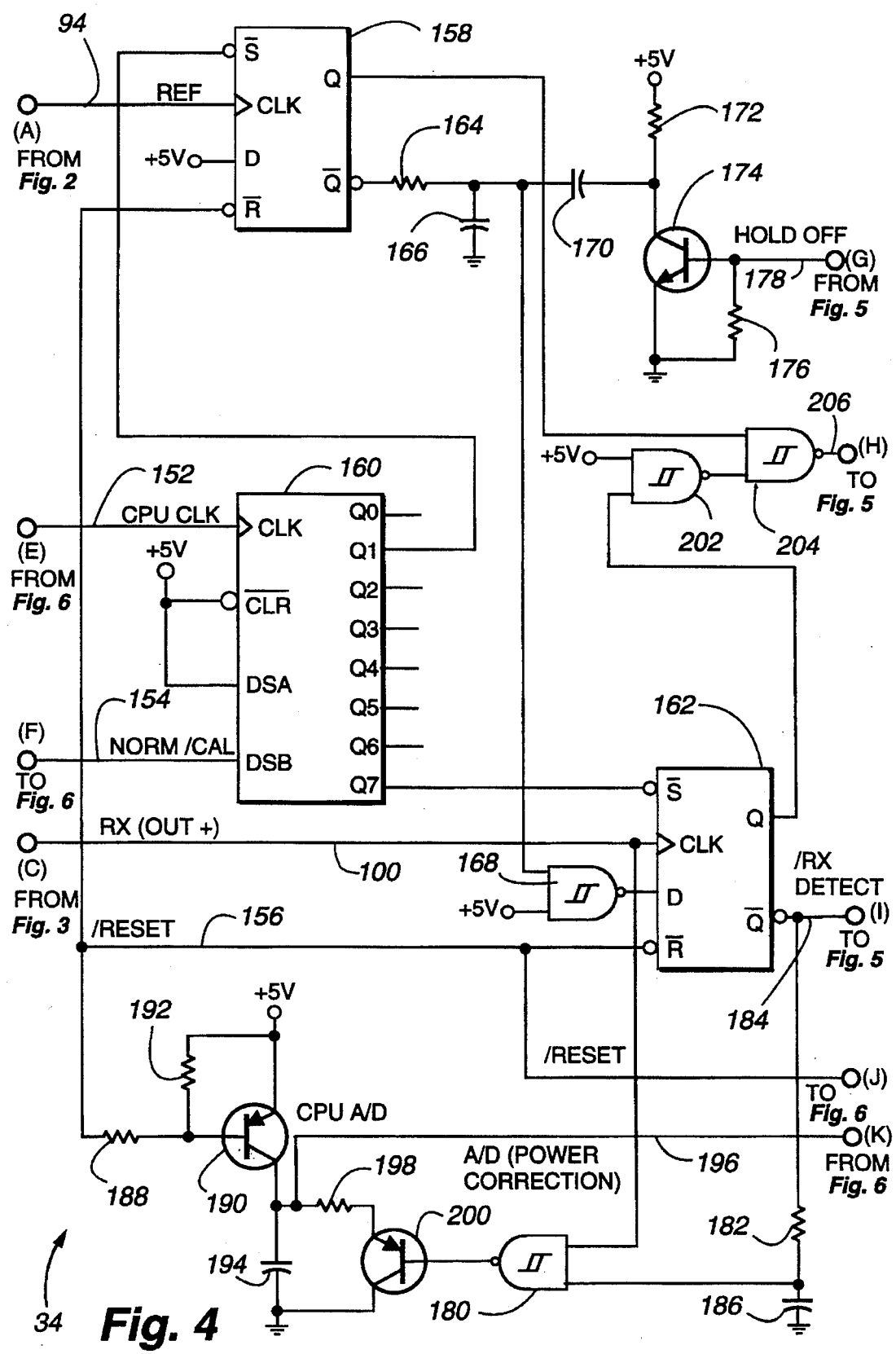
FIGS. 4 and 5 are further detailed schematic diagrams of the precision timing section of the laser range finder of FIG. 1 illustrating the circuit nodes for establishing the voltages $V_1$ and $V_2$ during the zero, calibration ("CAL") and laser firing phases of operation.

With reference additionally now to FIG. 4, a portion of the precision timing section 34 (shown in FIG. 1) is illustrated. A CPU clock ("CLK") signal is input to the precision timing section 34 on line 152 to the CLK input of a serial in/parallel out shift register 160 from the oscillator 30 as previously shown in FIG. 1. An additional input to the shift register 160 is received on line 154 comprising a NORM/CAL signal from the CPU section 28 to the data set B ("DSB") input thereof. The active low clear ("$\overline{CLR}$") input and DSA input are held high as shown.

An additional input to the precision timing section 34 is received from the CPU section 28 (shown in FIG. 1) on line 156 comprising a /RESET signal for input to the reset ("$\overline{R}$") inputs of D type flip-flop 158 and flip-flop 162. The $\overline{Q}$ output of flip-flop 158 is supplied as one input to an invertor comprising a portion of a NAND Schmitt trigger 168 through a low pass filter comprising resistor 164 and capacitor 166 as shown. The remaining input to the invertor 168 is connected to a source of +5 volts.

A resistor 172 couples a source of +5 volts to the collector of transistor 174 having its emitter coupled to circuit ground. The collector terminal of transistor 174 is coupled through capacitor 170 to the input of the invertor 168 coupled to the $\overline{Q}$ output of flip-flop 158. Transistor 174 has its based coupled to circuit ground through resistor 176 and receives a HOLD OFF signal on node 178 received from the CPU section 28.

The flip-flop 158 receives an input to its CLK terminal on line 94 comprising the REF output signal from the laser transmit section 18 (shown in FIG. 1). Its data ("D") input is coupled to a source of +5 volts and the Q1 output of the shift register 160 is provided to the active low set ("$\overline{S}$") input as shown. The Q output of flip-flop 158 is supplied as one input to a transmit gate 204 having its other input coupled to the output of an invertor comprising an additional NAND Schmitt trigger 202. Invertor 202 has one input connected to a source of +5 volts and another input connected to the Q output of flip-flop 162. Flip-flop 162 has its $\overline{S}$ input coupled to the Q7 output of shift register 160 and its D input connected to the output of invertor 168. The $\overline{Q}$ output of flip-flop 162 is supplied on line 184 to comprise a /RX DETECT signal for input to the CPU section 28 (shown in FIG. 1). The flip-flop 162 has its CLK input connected to line 100 for receiving the RX(OUT+) signal from the laser receive section 22 (shown in FIG. 1) which is also supplied as one input to NAND Schmitt trigger 180. The other input of NAND Schmitt trigger 180 is connected to line 184 through resistor 182 and coupled to circuit ground through capacitor 186. The output of Schmitt trigger 180 is supplied to the base electrode of transistor 200 which has its collector terminal coupled to circuit ground. Line 196, comprising an analog-to-digital ("A/D") POWER CORRECTION signal is supplied to the emitter terminal of transistor 200 through resistor 198 as well as to the collector terminal of transistor 190 which is coupled to circuit ground through capacitor 194. The /RESET signal on line 156 is supplied to the base terminal of transistor 190 through resistor 188. A source of +5 volts is connected to the emitter of transistor 190 as well as through resistor 192 to the base of transistor 190 to provide an operating bias.

Figure 5:
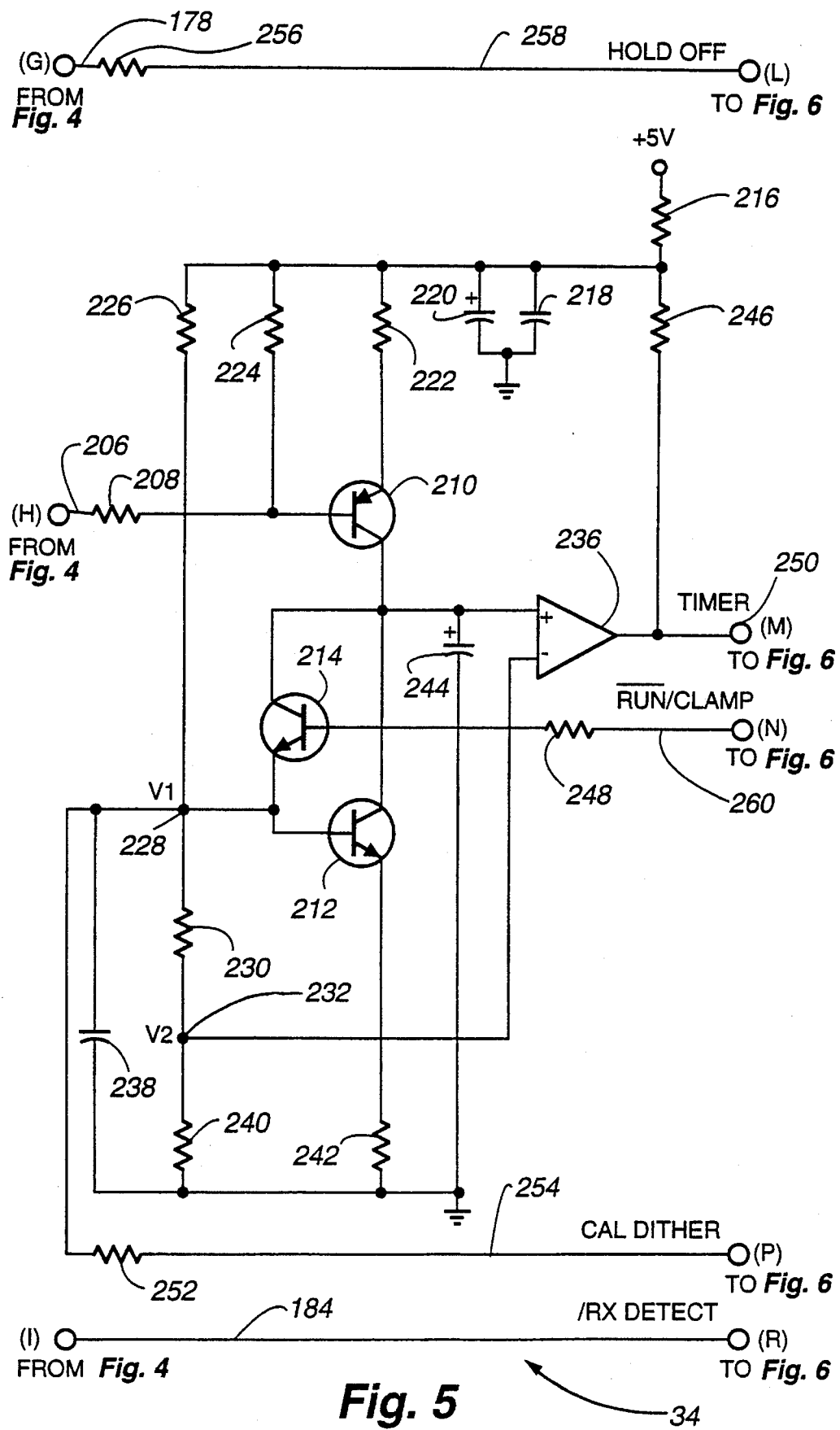

Referring additionally now to FIG. 5, the remaining portion of the precision timing section 34 (shown in block form in FIG. 1) is illustrated. The HOLD OFF signal output from CPU section 28 to the precision timing section 34 is supplied on line 258 through resistor 256 to node 178 for input to the base of transistor 174 (shown in FIG. 4).

The output of transmit gate 204 appearing on node 206 is supplied through resistor 208 to the base terminal of transistor 210. A source of +5 volts is supplied to the emitter terminal of transistor 210 through the series connection of resistor 216 and resistor 222. The node intermediate resistors 216 and 222 is coupled to circuit ground through the parallel combination of capacitors 218 and 222 as well as to the output of comparator 236 through resistor 246 to provide a TIMER signal on line 250 for input to the CPU section 28 as will be more fully described hereinafter. The source of +5 volts is also connected to the base terminal of transistor 210 through the series connection of resistors 216 and 224. A $V_1$ node 228 at the common connected base of transistor 212 and emitter of transistor 214 is coupled through a source of +5 volts through resistor 216 and resistor 226. Node 228 is connected through resistor 230 to $V_2$ node 232 which, in turn, is connected to circuit ground through resistor 240. A capacitor 238 couples $V_1$ node 228 to circuit ground. $V_2$ node 232 is connected to the "−" input of comparator 236. $V_1$ node 228 is connected to line 254 from the CPU section 28 (shown in FIG. 1) to receive the CAL DITHER signal through resistor 252.

The collector terminal of transistor 210 is coupled to the collector terminals of transistors 212 and 214 as well as to the "+" terminal of comparator 236 which, in turn, is coupled to circuit ground through capacitor 244. A RUN/CLAMP signal output from the CPU section 28 (shown in FIG. 1) is furnished on line 260 through resistor 248 for input to the base terminal of transistor 214.

With reference additionally now to FIG. 6, the CPU section 28 is shown in greater detail. The CPU section 28 comprises, in pertinent part, a microcomputer 270 which may, in a preferred embodiment, comprise a ST6240 device. An 8 megaHertz ("MHz") crystal 274 forms a portion of the oscillator 30 for providing an oscillator ("OSCIN") and oscillator out ("OSCOUT") signal to the microcomputer 270 as well as supplying a CPU CLK signal on line 152 for input to the precision timing section 34 as previously described. The VDD input of microcomputer 270 is coupled to a source of +5 volts and the /RESET input thereof is held high through pull up resistor 276 which is coupled to circuit ground through capacitor 278. Output from the microcomputer 270 is taken on a display bus 280 comprising the communication ("COM") lines COM 1–COM 4 and S16–S28 lines for input to the LCD display 32.

An A/D LOW BATTERY signal, a TRIGGER signal, and a POWER CONTROL signal are input to the microcomputer 270 on lines 284, 286, and 288 respectively. The A/D LOW BATTERY signal on line 284 is also supplied to the "–" input of comparator 296 which is coupled to circuit ground through capacitor 304. The "+" input of comparator 296 is coupled to a source of +5 volts through resistor 298 which is also coupled to circuit ground through the parallel combination of resistor 300 and capacitor 302. The output of comparator 296 appearing on line 306 provides a SHUTDOWN signal for the laser range finder 10 in the event the onboard battery voltage drops below a predetermined limit.

The microcomputer 270 supplies the HOLD OFF signal on line 258, the RUN/CLAMP signal on line 260, the CAL DITHER signal on line 254, the /RESET signal on line 156 and the NORM/CAL signal on line 154 for input to the precision timing section 34 as has been previously described. The microcomputer 270 receives as outputs from the precision timing section 34 the /RX DETECT signal on line 184 and the TIMER signal on line 250. Additional inputs to the microcomputer 270 are the /FIRE signal on line 80 from the laser transmit section 18 (shown in FIG. 1) as well as the A/D POWER CORRECTION signal on line 196 from the precision timing section 34 (as shown in FIG. 4). A MODE input signal on line 294 is received from the mode switch 126 which is otherwise held to a +5 volts through resistor 292. Microcomputer 270 supplies an NSET1 and NSET2 signal on lines 308 and 310 respectively as well a REFLECTION MODE signal on line 312 for input to the automatic noise threshold section 36 (as shown in FIG. 1).

In overall operation, a reference signal (REF) on line 94 is generated by the laser transmit section 18 (shown in FIG. 2) when the laser range finder 10 is fired by placing a current pulse through the laser emitting diode 20 in response to manual actuation of the trigger switch 14. The REF signal on line 94 is derived from the current placed through the laser emitting diode 20 and not from the light pulse itself and is sufficiently precise for accurately indicating the time of the laser firing. The REF signal is ultimately input to the CLK input terminal of flip-flop 158, which has its Q output coupled to the transmit gate 204, which then turns on the current switch comprising transistor 210, and starts charging the capacitor 244. When the receive pulse (RX(OUT+) on line 100 comes back from the laser receive section 22 (shown in FIG. 3), it triggers the flip-flop 162 at its CLK input. Flip-flop 162 has its Q output coupled to the input of invertor 202 which then shuts the transmit gate 204 off, stopping the current pulse. At this point, a constant current sink discharges capacitor 244. In this manner, capacitor 244 is charged up with a relatively large current (on the order of 10 milliamps), and later discharged with a small current (on the order of 10 microamps) applied over the entire flight time of the laser pulse from its firing from the laser emitting diode 20 to its reflection from a target back to the laser receiving diode 24. Because the laser range finder 10 is intended for a shorter maximum range than other laser based range finding instruments, the use of this technique does not require a separate counting oscillator followed by an interpolation operation and the entire flight time is essentially stretched by a factor of 1000 and then the stretched result is counted. By charging capacitor 244 at a fast rate and then discharging it and then monitoring the time it takes to discharge, the flight time is expanded so that the slower clock in the CPU section 28 can then count it accurately. The microcomputer 270 utilized in the CPU section 28 has a 1.5 microsecond resolution and, because the incoming flight time has been expanded by a factor of 1,000 on the input side to the precision timing section 34, it is the equivalent of a 1.5 nanosecond resolution, which corresponds to a measurement resolution for the laser range finder 10 of on the order of nine inches. Therefore, given that the laser range finder 10 is intended to be a one-yard instrument with a nine-inch resolution, sufficient resolution is provided to be able to measure distances up to a thousand yards to a one-yard accuracy.

The precision timing section 34 of the laser range finder 10 has three distinct modes of operation including a zero calibration, fixed pulse width calibration and laser measurement function as will be more fully described hereinafter. The portion of the precision timing section 34 comprising transistors 210, 214, and 212 (shown in FIG. 5) is the essence of the integrating flight time expander. Transistor 210 functions as a current switch which is turned on for the duration of the laser flight time in the laser mode of operation and is also turned on for the duration of whatever calibration pulse is placed into it during the calibrate mode. In the latter instance, a calibration pulse is supplied by the shift register 160 via flip-flop 158 and the start and end of the calibration pulse is gated via transmit gate 204 to actually turn the transistor 210 on and off in order to function as a current source, typically sourcing 10 milliamps of current. It should be noted that prior to turning transistor 210 on, transistor 214 must first be turned off and, when the system is in the reset state ready to start the whole measurement sequence, transistor 210 is off. Transistor 212, which is the current sink in the system, is always on, and typically sinks on the order of 10 microamps of current. In the reset condition, transistor 214 is on, and that clamps the voltage at the top plate of capacitor 210 to a voltage level designated as V1 at node 228. A voltage V2 is defined as the voltage at node 232 at the "–" input of comparator 236. It should also be noted that a metal oxide semiconductor field effect transistor ("MOSFET") may be utilized for transistor 214 and would exhibit a much lower offset than the bipolar device shown. However, due to the lower cost of bipolar transistors and the fact that any offset cancels during the processing of the signal, a bipolar transistor is entirely adequate for this purpose.

When transistor 214 is on, the voltage on the positive plate of capacitor 244 is clamped to voltage V1, plus a fixed offset due to the transistor 210, which is small and typically on the order of 50 millivolts. During the zero calibration function, transistor 214 is turned on by holding the RUN/CLAMP signal on line 260 high, thereby applying a positive current to its base through resistor 248. To initiate the zero calibration, the TIMER signal on line 250 is asserted and supplied to the microcomputer 270 of the CPU section 28. Utilizing the ST6240 unit shown in FIG. 6, when the microcomputer TIMER pin is held high, the device is counting. Conversely, the microcomputer stops counting when the pin is allowed to go low. In operation, the output comparator 236, determines whether or not the voltage at the top plate of capacitor 244 is greater or less than V2, and its output determines whether the TIMER pin on the microcomputer 270 is high or low. In the normal reset condition, the output of the comparator 236 is high, which means the timer is active. In sequence, the microcomputer 270 initiates the TIMER function and then turns off transistor 214 by lowering the control signal RUN/CLAMP on line 260, to unclamp capacitor 244. Capacitor 244 then starts discharging towards zero due to the current being drained out of it via transistor 212 at a rate of about ten microamps. When it has discharge such that the charge removed drops the voltage V1 at node 228 to the level of V2, the output of the comparator 236 changes state to stop the TIMER function. (In the particular embodiment shown, V1 is typically on the order of 1.0 volts and V2 is about 0.9 volts.) The microcomputer 270 of the CPU section 28 now has a count value that relates to the amount of time it takes for capacitor 244 to discharge from V1 down to V2. This process is repeated several times and the result is averaged. Typically ten iterations may be performed with the results accumulated and an average time computed.

As shown particularly with respect to FIG. 5, the CAL DITHER signal on line 254 is applied to the base terminal of transistor 212 and is utilized during both the zero calibration and fixed pulse width calibration times and incorporates a relatively high value resistor 252. The CAL DITHER signal allows for the introduction of a deliberately controlled change in the discharge current in order that the resultant count will vary slightly such that when the total counts are averaged together, a finer resolution is produced than would be the case merely using a fixed current to get the same count value. An adjustment of one part in about a thousand is provided during the zero calibration and fixed pulse width calibration modes because the finite resolution of the microcomputer 270 timer otherwise provides discreet timing intervals of 1.5 nanoseconds which would only provide distance measurement resolution of approximately one yard. In operation, the zero calibration count in the microcomputer 270 will typically be about 150 while in the fixed pulse width calibration mode it will be on the order of 900. The flight time count during the laser mode of operation can be anything from close to the zero calibration value to about 4500.

For example, during the zero calibration mode, the count value in the microcomputer 270 might be 150 but there is no way of knowing just how close the count actually is to 149 to 151. By utilizing the CAL DITHER signal to force the count over a couple of count boundaries (for example: 150, 150, 150, 151, 151, 152) the resolution of the counter may be effectively raised by a factor of two without having to utilize additional fine counters. In the embodiment shown, the resultant resolution is sufficient to maintain calibration to plus or minus one yard over a range of one thousand yards or less. Although implementations may vary, the CAL DITHER signal may be held high for five out of ten pulses and low for the remainder to provide the foregoing resolution enhancement. Due to the fact that the actual laser flight time varies due to noise in the laser pulses and variability in target aiming, there is generally enough scatter in the measured laser flight time such that it covers more than one clock boundary and so will automatically average to a higher resolution through the use of the precision timing section 34 without invoking the CAL/DITHER function in the laser mode of operation.

With reference additionally now to FIGS. 7A, 7B and 7C, the operation of the precision timing section 34 is shown in the zero calibration, fixed pulse width calibration and laser measurement function modes of operation respectively. In its normal state, the voltage on the top plate of capacitor 244 is clamped at V1, and at a time T0, the precision timing section 34 will initiate the TIMER by changing the output state of comparator 236 to the logic high state. After a very short fixed number of instructions later shown as $T_1$, the clamp transistor 214 will be turned off and the voltage on capacitor 244 will begin discharging slowly until that voltage crosses V2 at time $T_3$ when the output of comparator 236 will change state. In essence, during the zero calibration process, transistor 210 is never turned on thereby determining the timing conditions of what would effectively be a zero flight time. Therefore, if there is no charge current applied to capacitor 244, $T_3-T_0$ zero is the time that would be in the microcomputer 270 and the timer in whatever units they operate, which is usually dependent on the CPU section 28 crystal frequency. In the embodiment shown, the microcomputer 270 utilizes an 8 MHz crystal and the internal timer has a 1.5 microsecond resolution resulting in a count of about 150.

During the fixed pulse width calibration process (shown particularly in FIG. 7B) at time $T_4$, once again the microcomputer 270 stops the TIMER and a short time later at $T_5$ it releases the clamp. At $T_6$, a known pulse width is applied to the base terminal of transistor 210 which is precisely derived from the main oscillator 30 as applied to the CLK input of the shift register 160. The signal applied to the CLK input of the shift register 160 directly tracks the main oscillator 30 and the serial data input to the shift register 160 is a logic line 154 from the CPU section 28 designated NORM/CAL. When the NORM/CAL signal is high, the precision timing section 34 is in its normal mode of operation and, when it drops to a logic low state, the fixed pulse width calibration function is initiated. Thereafter, typically about fifty microseconds later, at time $T_6$ the NORM/CAL signal on line 154 will be dropped low. It should be noted that during both the zero and the fixed pulse width calibration modes, the logic reset signal /RESET on line 156 is held low, its active state. In the logic low state the two flip-flops 158, 162 determine whether the input signal comes from shift register 160 which generates the fixed pulse width or whether it comes from the REF and RX(OUT+) signals an relates to an actual laser flight time. The /RESET signal is generally held low at all times during the fixed pulse width calibration process so that any noise on the RX(OUT+) receive line 100 will not accidently clock flip-flop 162 and therefore trigger the precision timing section 34 resulting in an indeterminate time period measurement invalidating the calibration. The reset state for the Q outputs of flip-flops 158, 162 is low but is high for the $\overline{Q}$ outputs. Therefore, the $\overline{Q}$ outputs can not be directly driven with the reset circuit and must be driven off the Q outputs in both cases which introduces a small fixed offset delay which must be accounted for later. As soon as the NORM/CAL signal on line 154 is dropped low, which occurs approximately 50 microseconds after the clamp has been released, the low signal propagates through the shift register 160 precisely with the main oscillator 30 clock. The Q0 output of the shift register 160 is the first to be triggered but is not used because it is used to synchronize with the incoming signal. The Q1 is then the first output of the shift register 160 to be utilized and on every positive edge of the clock the zero signal that is applied into the serial input will propagate one state of the shift register 160 from Q zero to Q7. Therefore, the Q1 output will go low first, and as soon as that output goes low, the set line input $\bar{S}$ forces the Q output of flip-flop 158 to go high since the Q output of flip-flop 162 is in the low state. As a result, logic level ones appear at the two inputs of the transmit gate 204, which turns on the current switch transistor 210. Exactly six clocks later, the same thing happens with flip-flop 162 which has its $\bar{S}$ input coupled to the Q7 output of the shift register 160. As the Q output of flip-flop 162 goes high, the output of the invertor 202 goes low, and the transmit gate 204 will be turned off. At this point the count pulse will stop meaning that the fixed width pulse feeding the current switching circuit at the output of the transmit gate 204 is precisely six clock cycles. The time difference between the Q1 and Q7 outputs of the shift register 160 is exactly 750 nanoseconds when utilizing an 8 MHz oscillator 30 applied to its CLK input. The invertor 202 adds an additional delay of about 10 nanoseconds for a total of delay of about 760 nanoseconds which varies only slightly with temperature, perhaps one or two nanoseconds, yet still provides sufficient precision for measurements of less than one yard resolution.

Transistor 210 is then turned on for a period of time between $T_6$ and $T_7$ to enable the capacitor 244 to charge very rapidly and then discharge at the same rate as has been previously shown with respect to FIG. 7A. As V1 reaches the level of V2 the TIMER signal goes low at Time $T_8$. The fifty microsecond delay between the unclamping at $T_5$ and $T_6$ is to allow the clamp transistor 214 to turn off fully since it is a relatively inexpensive bipolar device. If a MOSFET were used instead, its turn off would be virtually instantaneous and the additional delay it introduced would not be a problem because the microcomputer 270 couldn't issue the next instruction quickly enough. Utilizing a bipolar device, approximately 20 microseconds are required for the discharge to become linear and the slope of the discharge curve between $T_7$ and $T_8$ is then identical to the slope from $T_1$ to $T_3$ in the zero calibration mode except for the step due to the charging of capacitor 244. As a consequence, the value of $ZERO_{TIME}$ equals $T_3$ minus $T_0$ and the value of $CAL_{TIME}$ value equals the time due to the $CAL_{TIME}$ value not due to the $ZERO_{TIME}$ value, which is, $T_8$ minus $T_4$ minus the $ZERO_{TIME}$ value or, $T_8$ minus $T_3$.

In essence then, very small flight times are effectively disregarded and the value of $CAL_{TIME}$ is known. Therefore, with the zero calibration function and the addition of a known calibrated pulse width, the time delay at zero is known together with the time delay for the known pulse width providing the origin and scale for determining distance with a constant linear discharge of capacitor 244.

With particular reference additionally to FIG. 7C, the operation of the precision timing section 34 is shown in the laser measurement mode of operation. The laser measurement operation is essentially the same as the fixed pulse width calibration mode except that the NORMAL/CAL signal on line 154 to the shift register 160 is held high and the /RESET signal on line 156 is taken high at time $T_9$ to enable the flip-flops 158, 162 to trigger. At time $T_{10}$ the timer is started and at $T_{11}$, (at precisely the same relationship $T_{11}$ minus $T_{10}$ equals $T_5$ minus $T_4$ equals $T_1$ minus $T_0$) the clamp is released. There is normally a fifty microsecond wait and then the laser pulse is fired when the microcomputer 270 asserts the /FIRE signal on line 80 to initiate the firing sequence. Upon firing the laser emitting diode 20, the laser transmit section sends the REF signal on line 94 to the CLK input of flip-flop 158 of the precision timing section 34. This opens the transmit gate 204 which turns on the current source transistor 210, which, in turn, charges capacitor 244 at a known rate.

When the reflected laser pulse is detected by the laser receiving diode 24 of the laser receive section 22 (shown in FIG. 3), the RX(OUT+) signal on line 100 is directed to the CLK input of flip-flop 162. The Q output signal of flip-flop 162 is inverted by invertor 202 which turns off the transmission gate 204 so that the current source transistor 210 is on for the flight time duration of the laser pulse to charge capacitor 244 to a level determined by the timer during that flight time. The charge applied to the capacitor 244 may be anything from just a few millivolts (essentially zero distance and flight time) to up to two volts (maximum range and flight distance) depending on the distance to the target. Time $T_{12}$ represents the firing of the laser as indicated by the REF signal and $T_{13}$ represents the receipt of the reflected laser signal as indicated by the RX(OUT+) signal. Transistor 210 is turned on at $T_{12}$ and turned off at $T_{13}$. As a consequence, V1 will equal V2 at anytime between $T_{14A}$ (minimum distance when $T_{12}$ and $T_{13}$ are essentially coincident) and $T_{14B}$ (maximum range of the laser range finder 10). Times $T_{14A}$ through $T_{14B}$ represent the range of times (depending on the distance to the target) when the value of V1 is discharged below the level of V2 and the comparator 236 output changes state stopping the timer.

The actual laser flight time $LASER_{TIME}$ (or $FLIGHT_{TIME}$) then equals $T_{14A}$ (or $T_{14B}$) minus $T_{10}$ minus $ZERO_{TIME}$ or, $T_{14}$ minus $T_{13}$. The time $T_8$ has to be greater than $T_3$, and $T_{14}$ is greater than or equal to $T_3$. There is no theoretical limit on the lower range of the laser range finder 10 and flight time (and distance) can be measured down to zero due to its linearity. The only factors in the near zero range are the time it takes transistor 210 to turn on, the propagation time of the laser beam and the various circuit gates, but since the time for each of these factors is the same during calibration as during flight time, they essentially cancel out. The precision timing section 34 can be effectively utilized down to on the order of ten nanoseconds and still remain perfectly linear. RANGE to a target is then a constant, "k" times the quantity $FLIGHT_{TIME} - ZERO_{TIME}$ over $CAL_{TIME} - ZERO_{TIME}$.

For each of the values: $ZERO_{TIME}$, $CAL_{TIME}$ and $FLIGHT_{TIME}$ values are accumulated and are expressed in time units that derive from the very accurate crystal oscillator 30. Typically, ten pulses may be utilized to establish the $ZERO_{TIME}$ average, ten pulses to establish the $CAL_{TIME}$ average and ten pulses to establish the minimum precision (or rough) $FLIGHT_{TIME}$ range to the target. Another group of ten through thirty laser pulse $FLIGHT_{TIME}$s may be also averaged in order to obtain a higher precision distance to a target as indicated by a "precision flag" which may be displayed on the LCD display 32 within the laser range finder 10 eyepiece. Nevertheless, the actual values derived in these time expansions will, of course, vary with time, temperature and aging and affects the gain of the transistors, the leakages, as well as the value of the resistances and capacitances. Initially the exact values of these effects are completely unknown but, through the use of the zero and calibration functions above-described, the zero problem has been eliminated, and a crystal reference calibration has been provided for the entire flight time without having to resort to a complicated counter circuitry.

Another aspect of the precision timing section 34 is the automatic set noise control and invertor 168 provides, in conjunction with other circuit elements, a hardware hold off function. Upon firing of the laser and receipt of the reference signal REF on line 94 at the CLK input of flip-flop 158, a certain time must elapse, as determined by the time constant of resistor 164 and capacitor 166, before the D input goes high. Until that time, all noise pulses and/or early laser pulses on the clock line are ignored. The purpose for this function is that, when the laser fires, it generates unintended ground bounce and noise that may prematurely trigger the receive flip-flop 162 rather than the real laser return signal (RX(OUT+)). For that reason, a hold off period is provided corresponding to the minimum range of the laser range finder 10 and, as an example, considering a minimum range of about twenty yards, the holdoff time is approximately 60 nanoseconds. With a lower sensitivity laser range finder 10 utilized at shorter ranges the function can be eliminated and it is clearly most useful with a high sensitivity receiver where the noise from the firing circuit determines an effective minimum range.

Transistor 174 provides an additional function and allows the microcomputer 270 to extend the hold off range by asserting the HOLD OFF signal on line 258. In this manner, the minimum range of the laser range finder 10 may be extended out to, for example, sixty or eighty yards, whatever is the desirable setting. This microcomputer 270 hold off function may be implemented by the mode switch 126 and would allow shooting through branches, twigs, precipitation or other partial obstructions. By extending the hold off range out beyond such partial obstructions, there is insufficient back scatter from the obstructions to trigger the precision timing section 34 and the measurement will be made to the desired target instead of the intervening obstructions. This is accomplished by not allowing flip-flop 162 to trigger until a set timer period has elapsed. Transistor 174 is the switching device utilized to allow setting of an extension to the hold off range and gate 180 is used to determine the receive pulse width in conjunction with the discharge rate of capacitor 194. This allows the microcomputer 270, which has a built in analog-to-digital ("A/D") convertor, to determine the residual voltage on capacitor 194 and therefore derive a measure of the pulse width, (which is a measure of the return signal power) and thus use an internal lookup table to correct for that power variation and get a higher range accuracy. When the logic reset signal /RESET on line 156 is low, transistor 190 clamps capacitor 194 to the +5 volt rail. During the laser measurement routine, the transistor 190 is turned off. When a pulse subsequently arrives, that bit turns on transistor 200 and the voltage in capacitor 194 will be discharged via resistor 198 for the duration of that pulse. The charge on capacitor 194 is then digitized by the processor to determine the effect of incoming power.

With reference additionally now to FIG. 8, the automatic noise threshold section 36 of the laser range finder 10 is shown. The automatic noise threshold section 36 receives the RX(OUT+) signal from the laser receive section 22 (shown in FIG. 1) on line 100 for input thereto through resistor 314. Resistor 314 is connected to the anode of diode 316 which has its cathode connected to the "+" input of operational amplifier ("OpAmp") 318 forming a $V_3$ node 320. $V_3$ node 320 is coupled to circuit ground through the parallel combination of resistor 322 and capacitor 324. The output of OpAmp 318 is coupled back to the "−" input thereof as well as to line 102 through resistor 326 for supplying the $V_{threshold}$ signal to the laser receive section 22 (shown in FIG. 1). Line 102 is connected through resistor 330 to the center tap of potentiometer 332 which has one terminal thereof connected to a source of +5 volts through resistor 334 and another terminal thereof coupled to circuit ground through resistor 336.

Lines 308 and 310 from the microcomputer 270 (shown in FIG. 6) are connected through resistors 338 and 340 respectively to line 102. Additionally, line 312 from microcomputer 270 is connected to line 102 through resistor 342 as shown.

In operation, the automatic noise threshold section 36 in conjunction with the CPU section 28 (shown in FIG. 6) provides a simply implemented yet highly effective threshold adjustment to the laser receive section 22 (shown in FIG. 3) As shown in FIG. 3, the laser receiving diode 24 utilizes a high-voltage source (of about 50 volts) supplied via a noise filtering network, comprising low pass filter network 106, to bias it. The diode 24 responds with an output current proportional to the incoming laser light which is generally a short duration laser pulse producing a short current pulse which is amplified by transistors 118, 120, 122, 124, comprising the active circuit elements of a transimpedance amplifier 116. The transimpedance amplifier 116 produces an output voltage pulse proportional to the incoming laser pulse impinging on the laser receiving diode 24. The output of the transimpedance amplifier 116 is capacitively coupled to the "+" input of comparator 134, which is a high speed comparator. When the laser pulse input to the "+" input crosses a threshold determined by the voltage on the "−" threshold pin, a positive output pulse is produced.

To maximize performance, the threshold of the comparator 134 has to be set for maximum sensitivity in order detect the weakest possible laser pulse to get the maximum performance out of the laser range finder 10. Conventional approaches include using digital controls or a potentiometer to adjust the threshold. However, these approaches have the down side that over time and temperature changes the gain of the receiver will change with the background noise generated by the background light rendering a fixed threshold as less than an ideal solution.

The automatic noise threshold section 36 of FIG. 8 discloses a circuit that automatically sets a threshold such that a constant noise pulse firing rate is output from the detector comprising resistor 314, diode 316, capacitor 324 and resistor 322. In operation, when the threshold pin of the comparator 134 (FIG. 3) is at a considerably higher voltage than the input pin, no noise pulses will appear at the output due to the inherent amplifier and optically generated noise. As the voltages on the threshold and input pins are brought closer together, noise pulses will appear at the output and, when the voltage levels are nearly coincident, a great deal of noise can be seen. In essence then, the automatic noise threshold section 36 sets the noise pulse rate at that point at which, given the right firmware algorithm, one can still acquire the target and not be blinded by the noise. The higher the noise that can be tolerated, and the closer the voltage levels at the threshold and input pins of the comparator 134, the weaker the laser pulse that can be detected. The automatic noise threshold section 36 automatically adjusts that threshold level to maintain constant noise pulse firing rate.

As shown in FIG. 8, this is accomplished by monitoring the digital logic receive signal RX(OUT+) on line 100 that goes to the receive flip-flop 162 (shown in FIG. 4). The detector monitors line 100 for the presence of noise pulses via a detector comprising the aforementioned resistor 314, diode 316, capacitor 324 and resistor 322. The value of resistor 322 is typically considerably greater than that of 314, on the order of a 150:1 ratio. The peak amplitude of the noise pulses is typically at or near the logic threshold, except for very narrow pulses where the comparator will not reach full amplitude, however, the width of these pulses is going to vary randomly because it depends on the noise signal that is being detected. Moreover, the spacing of the noise pulses will also vary at a random rate, but, for any given threshold setting, there will be a fixed average rate. The average rate is dependent on the threshold. Therefore, during the time the pulse is high, capacitor 324 charges via resistor 314 and diode 316 at a rate determined by the high on the logic pulse, resistor 314 and whatever voltage is still existing on capacitor 324.

Initially, capacitor 324 is charged as follows. Once the noise pulse terminates, the logic line goes back to zero. There is a residual voltage on capacitor 324, diode 316 will be reverse biased, and the discharge path is now via resistor 322. (As previously described, the value for resistor 322 is chosen to provide a relatively longer time constant, a factor of 150.) When another pulse comes in, capacitor 324 will charge a bit more. What will then happen is, quite rapidly, (i.e. within a few milliseconds) the voltage across capacitor 324 stabilizes at a rate that is proportional to the average firing rate. The reason for having a large ratio between resistor 314 and resistor 322 is because the noise pulses typically may average 50 nanoseconds wide, and the averaged time between them to maximize the sensitivity of the laser range finder 10 should be of the order of two microseconds or so. As an example, if a 50% voltage were desired, and the high state was occurring for 50 nanoseconds while the low state average was occurring for one microsecond, a 20:1 ratio would be produced. Nevertheless, the optimum ratio has been determined empirically to be about 150:1 as previously described and is related to average pulse widths (typically on the order of 30 nanoseconds in length) and pulse repetition rates (on the order of 4 microseconds) with a typical voltage level of 1.5 volts.

Op amp 318 is configured as a unity gain buffer, although it need not be unity gain, with a voltage V3 at its "+" input pin on node 320. The input is high impedance and the output is low impedance in order to drive external circuitry. The voltage that is derived at the output of the op amp 318 is then fed into a resistor network comprising resistor 338, resistor 340, resistor 342 and resistor 330. A summing node of the resistor network on line 102 goes to the threshold control to provide the signal $V_{threshold}$ to the laser receive section 22 (shown in FIG. 3). Resistor 330 is connected to the center tap of a potentiometer 332 so that the DC voltage on the other end of resistor 330 can be controlled.

In combination, the circuit comprises a feedback network such that, if there are no noise pulses, then V3 is zero and $V_{threshold}$ and drops to a low value. Initially, $V_{threshold}$ will be higher, and the "–" input of comparator 134 (shown in FIG. 3) will be higher than the "+" input, forcing a logic low on the output as the starting state. As the level of V3 on node 320 falls, the voltage level on the "–" pin of comparator 134 starts approaching the level of the signal from the transimpedance amplifier 116 on the positive "+". When it approaches the noise zone, noise pulses start appearing. As soon as noise pulses start appearing, a charge appears on node 320, so V3 stops to charge up, and when the two match, that's the feedback point, and it stops. Basically, the voltage on the threshold is set at such a point that the noise firing rate maintains V3 at that voltage which is necessary to maintain $V_{threshold}$. Because very small changes in $V_{threshold}$ make a very large change in the noise firing rate, typically, a ten millivolt change in $V_{threshold}$ will change the voltage V3 at node 320 by about a volt. What is produced then, is a fairly high gain feedback loop, such that $V_{threshold}$ will track very closely the noise firing rate and V3 will stabilize very accurately and rapidly. This further provides the capability to adjust the noise firing rate by controlling the bias and forcing V3 to compensate. The voltage V3 at node 320 then represents the noise firing rate.

NSET1 line 308 and NSET2 line 310, are two control lines from the microcomputer 28 such that when held low or high, adjusts the noise rate to obtain the maximum range to different reflectivity targets. If both lines 308 and 310 are taken high, V3 will drop to compensate to maintain a constant threshold noise. Similarly, potentiometer 332 provides an adjustment such that the threshold point may be set together with the level of V3. Typically, the V3 point might be set equal to: 0.5, 1.0, 1.5 and 2.0 volts as desirable choices for the average noise firing rates. As such, since resistor 338 is approximately twice the value of resistor 340, four voltage combinations are obtained roughly equally spaced in voltage by half a volt. Potentiometer 332 is used to set the first voltage level to 0.5 or the last one to 2.0 while the intervals are determined by the logic control lines 308 and 310 set NSET1 and NSET2. Obviously, this approach could be extended, four combinations provides adequate resolution in the particular implementation of the laser range finder 10 described and shown. When both lines 308 and 310 are high, there is a current injected into the node comprising the $V_{threshold}$ line 102, and to compensate for that, V3 must drop, so less current flows through resistor 326 and vice versa. V3 will follow these values, depending on the permutations of logic high and low signals on the lines 308 and 310. Resistor 330 is used just to set where this whole block resides while potentiometer 332 is used to establish the initial set point. Since the noise characteristics from unit to unit will vary somewhat, potentiometer 332 enables the setting of the initial device characteristics.

Resistor 342 is of a considerably lower value than resistors 338 and 340 and its value is chosen such that, when the REFLECTOR MODE signal on line 312 is asserted by being taken high, V3 will drop to zero and will stay there because it cannot go below zero. At this point, the feedback loop is saturated and is no longer effective, so $V_{threshold}$ is no longer stabilized. In operation, line 312 will be pulled high by a considerable voltage, on the order of 0.4 volts, such that it completely desensitizes the laser receive section 22 so the laser range finder 10 will then only respond to a retro reflector. In this mode of operation the receiver is detuned and its non-cooperative range drops from 500 yards down to about 30 or 40 yards, such that the laser range finder 10 only latches onto a retro reflector or survey prism comprising a high grade reflector that returns the laser energy back to the source. Possible applications also include determining the distance to a particular golf hole where a laser reflector is attached to the pin and the signal might otherwise be actually returned from trees behind or in front of the green in a more sensitive mode of operation.

The essence of the automatic noise threshold section 36 is, as previously described, a feedback loop comprising the detected average noise firing rate forming a feedback loop that controls the threshold. Use of this circuit has resulted in an addition of almost 50% to the range of the laser range finder 10 compared to attempting to manually set the threshold. By setting the noise firing rate, noise pulses are being produced deliberately, all the time and the only way you to take advantage of that fact is by implementing a firmware algorithm in the microcomputer 270 that allows you to discriminate between noise pulses and laser return pulses. What the algorithm does is, during the laser firing process, on the first pulse that fires, it gets a laser pulse, and it places it in a stack of pulses. For example, the stack may have locations designated 0 through 9, to enable 10 pulses to be maintained in the stack. The values of the FLIGHT$_{TIME}$ are saved, corrected for power return, (the microcomputer 270 determines the power level of the return signal and corrects the flight time for power return) and placed in one of the locations in the stack. Upon receipt of the next pulse, the microcomputer 270 will then compare the next pulse with the remaining locations in the stack. Initially, most of the locations will be empty, and there will be no match. If no match is found, the microcomputer 270 puts the pulse in the stack and carries on, merely placing pulses in the stack, and then when it gets to the top, it goes back and overwrites the base, so you have a history of N number of pulses in the stack. Any time a new pulse comes in, it compares the entire stack for a match, where N=10, it searches the preceding ten pulses for a match.

The reason for doing that is, since a high noise firing rate has been deliberately set to get maximum sensitivity, many noise pulses are going to have shown up, but the noise pulses will be of random occurrence and the chance of a precision match is very low. Because the tolerance can be set as any other firmware parameter, a default value will be typically loaded that has been determined empirically. As an example, a tolerance of a few nanoseconds may be set for a match to be assumed to be a real target and not a noise pulse. Utilizing the algorithm, the process continues, trying to lock on the target until a match is achieved. The match need only be two pulses within the preset tolerance (providing very acceptable results) or, if higher sensitivity were desired, a match of three through N may be specified, depending on the reliability needed to guarantee a real target and not a noise pulse. In an exemplary operation, the first pulse (pulse 0) could be the real target, followed by eight noise pulses, and as long as the ninth pulse is again the real target, the distance to the target can be accurately determined. The stack can be increased in size up to whatever memory limit is available in the system, depending on how far into the noise level the laser range finder 10 must work.

Having found a match, the average of the match values may then be used to compare all subsequent pulses, rather than needing to place them in a stack and only pulses that match up with that initial match average will contribute to the measurement. If a certain number of pulses elapse before another matching pulse is received, it may be assumed that an accidental lock-on to noise has been achieved and the process restarts. By adjusting the various parameters, a trade off can be made between the time it takes to get a measurement to how far into the noise the laser range finder 10 must work. Because the noise rate can set to whatever is desired by means of the automatic noise threshold section 36, it is possible to optimize the algorithm to provide the optimum acquisition characteristics against time and against range.

The higher the value of V3, the more noise is coming out of the receiver, and the more sensitive the laser receive section 22 is running. The probability of a noise pulse showing up is proportional to the flight time, so given a very "black" target, the maximum range will be less, but the maximum flight time is also less, so a higher noise rate can be tolerated. Therefore, running at a higher gain will provide the best range to a black target. On the other hand, if the target is very reflective, a high gain is not required, so the noise rate can be lowered, which then provides the same probability of a noise pulse appearing over a longer flight range, and therefore a quick acquisition on a bright white target can be achieved. Thus, by depressing the mode switch 126, different modes of operation of the laser range finder 10 can be selected. As an example, one mode might be utilized to find the range to reflective road signs out to a distance of 1000 yards or more. Alternatively, aiming the laser range finder 10 at something like wet black tree bark, might reduce the maximum range to only 350–400 yards and so a different operational mode might be selected which would otherwise require a relatively long time to hit the road sign, if ever, because there would always be a noise pulse in the way. The mode switch 126 allows the setting of these variables to maximize the range of the laser range finder 10, depending on the target quality and a visual indication of the target quality selected may be provided to the operator on the in-sight, LCD display 32 wherein the first mode would correspond to the brightest target or most reflective target, and the Nth mode would correspond to the least reflective target.

While there have been described above the principles of the invention in conjunction with specific apparatus, it is to be clearly understood that the foregoing description is made only by way of example and not as a limitation on the scope of the invention.

What is claimed is:

1. A method for determining a range to a target based upon a flight time of a pulse toward said target, said method comprising the steps of:

initially establishing first and second reference voltage levels;

firstly unclamping said second reference voltage level;

firstly allowing said second reference voltage level to diminish at a first rate to said first reference voltage level;

firstly storing a first reference time T1$_{ref}$ from said step of unclamping until said first and second reference voltage levels are equal;

re-establishing said first and second reference voltage levels;

secondly unclamping said second reference voltage level;

increasing said second reference voltage level at a second higher rate than said first rate for a predetermined period of time to establish a third reference voltage level;

secondly allowing said third reference voltage level to diminish at said first rate to said first reference voltage level;

secondly storing a second reference time T2$_{ref}$ from said step of secondly unclamping until said first and third reference voltage levels are equal;

again re-establishing said first and second reference voltage levels;

thirdly unclamping said second reference voltage level;

again increasing said second reference voltage level at said second higher rate for a period of time related to said flight time of said pulse to said target to establish a fourth reference voltage level;

thirdly allowing said fourth reference voltage level to diminish at said first rate to said first reference voltage level;

thirdly storing a third reference time T3$_{ref}$ from said step of thirdly unclamping until said first and fourth reference voltage levels are equal; and computing said range to said target as proportional to (T3$_{ref}$–T1$_{ref}$)/(T2$_{ref}$–T1$_{ref}$).

2. The method of claim 1 wherein said steps of initially establishing, re-establishing and again re-establishing are carried out by clamping a voltage on a capacitor at said second voltage level.

3. The method of claim 2 wherein said steps of firstly, secondly and thirdly unclamping are carried out by means of a transistor switch.

4. The method of claim 2 wherein said steps of firstly, secondly and thirdly allowing are carried out by removing charge from said capacitor at said first rate as determined by a resistor switched in parallel with said capacitor.

5. The method of claim 2 wherein said steps of increasing and again increasing are carried out by applying a charge to said capacitor at said second rate.

6. The method of claim 1 wherein said predetermined time is determined by a clock reference source.

7. The method of claim 6 wherein said clock reference source comprises a crystal oscillator.

8. The method of claim 1 wherein said period of time related to said flight time of said pulse to said target is determined between a transmission of said pulse to said target and a reception of a reflection of said pulse from said target to a point of said transmission.

9. The method of claim 1 wherein said second rate is substantially 1000 times said first rate.

10. The method of claim 1 wherein said step of computing is carried out by means of a microcomputer.

11. A system for determining a range to a target based upon a flight time of a pulse toward said target, said system comprising:

means for initially establishing first and second reference voltage levels;

means for firstly unclamping said second reference voltage level;

means for firstly allowing said second reference voltage level to diminish at a first rate to said first reference voltage level;

means for firstly storing a first reference time $T1_{ref}$ from said step of unclamping until said first and second reference voltage levels are equal;

means for re-establishing said first and second reference voltage levels;

means for secondly unclamping said second reference voltage level;

means for increasing said second reference voltage level at a second higher rate than said first rate for a predetermined period of time to establish a third reference voltage level;

means for secondly allowing said third reference voltage level to diminish at said first rate to said first reference voltage level;

means for secondly storing a second reference time $T2_{ref}$ from said step of secondly unclamping until said first and third reference voltage levels are equal;

means for again re-establishing said first and second reference voltage levels;

means for thirdly unclamping said second reference voltage level;

means for again increasing said second reference voltage level at said second higher rate for a period of time related to said flight time of said pulse to said target to establish a fourth reference voltage level;

means for thirdly allowing said fourth reference voltage level to diminish at said first rate to said first reference voltage level;

means for thirdly storing a third reference time $T3_{ref}$ from said step of thirdly unclamping until said first and fourth reference voltage levels are equal; and means for computing said range to said target as proportional to $(T3_{ref}-T1_{ref})/(T2_{ref}-T1_{ref})$.

12. The system of claim 1 wherein said means for initially establishing, re-establishing and again re-establishing comprise a transistor switch for coupling a capacitor to a source of said second voltage.

13. The system of claim 12 wherein said means for firstly, secondly and thirdly unclamping comprises a second transistor switch for decoupling said capacitor from said source of said second voltage.

14. The system of claim 12 wherein said means for firstly, secondly and thirdly allowing comprise a third transistor switch coupling a resistor to said capacitor.

15. The system of claim 12 wherein said means for increasing and again increasing are carried out by applying a charge to said capacitor at said second rate.

16. The system of claim 11 wherein said predetermined time is determined by a clock reference source.

17. The system of claim 16 wherein said clock reference source comprises a crystal oscillator.

18. The system of claim 11 wherein said period of time related to said flight time of said pulse to said target is determined between a transmission of said pulse to said target and a reception of a reflection of said pulse from said target to a point of said transmission.

19. The system of claim 11 wherein said second rate is substantially 1000 times said first rate.

20. The system of claim 11 wherein said means for computing comprises a microcomputer.

21. The system of claim 11 wherein said means for firstly, secondly and thirdly unclamping said second reference voltage level further comprise:

means for initiating a timer.

22. The system of claim 21 wherein said means for firstly, secondly and thirdly storing comprise a comparator operatively stopping said timer upon coincidence of said first and second, said first and third, and said first and fourth reference voltage levels respectively.

* * * * *